US012783303B2

(12) United States Patent
Keskin et al.

(10) Patent No.: US 12,783,303 B2
(45) Date of Patent: Nov. 3, 2026

(54) POWER NEURAL NETWORK-BASED WORKLOAD DISTRIBUTION IN DISTRIBUTED COMPUTING SYSTEMS

(71) Applicant: QUALCOMM Incorporated, San Diego, CA (US)

(72) Inventors: Mustafa Keskin, San Diego, CA (US); Shruti Chittawadgi, Belgaum (IN); Omprakash Guniya Mohan Ram, Leander, TX (US); Christopher Koob, Round Rock, TX (US); Andriy Temko, Ballincollig (IE); Venkatarakesh Kumar Mamidi, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 18/333,839

(22) Filed: Jun. 13, 2023

(65) Prior Publication Data

US 2024/0419963 A1 Dec. 19, 2024

(51) Int. Cl.

| | |
|---|---|
| ***G06F 9/48*** | (2006.01) |
| ***G06F 9/50*** | (2006.01) |
| ***G06N 3/02*** | (2006.01) |
| ***G06N 3/08*** | (2023.01) |

(Continued)

(52) U.S. Cl.

CPC .......... *G06F 9/4893* (2013.01); *G06F 9/5044* (2013.01); *G06F 9/5094* (2013.01); *G06N 3/08* (2013.01); *G06N 3/098* (2023.01); *G06F 9/50* (2013.01); *G06N 3/02* (2013.01); *G06N 20/20* (2019.01)

(58) Field of Classification Search

None

See application file for complete search history.

(56) References Cited

U.S. PATENT DOCUMENTS

2024/0160491 A1* 5/2024 Taneja ............... G06Q 10/0631

OTHER PUBLICATIONS

Luo et al., "Power consumption prediction model and method based on federated learning", May 25, 2023, CCPCDL 2023, Proc. of SPIE vol. 12712, pp. 1-6. (Year: 2023).*

(Continued)

*Primary Examiner* — Qing Yuan Wu

(74) *Attorney, Agent, or Firm* — Patterson & Sheridan LLP

(57) ABSTRACT

Certain aspects of the present disclosure provide techniques and apparatus for distributing a workload across computing devices within a distributed computing system. An example method generally includes receiving, from at least one respective computing device of a plurality of computing devices in a distributed computing environment, information defining a respective power neural network. The respective power neural network generally is trained to predict power utilization for the respective computing device for a task to be executed on the respective computing device. For one or more computing devices, power utilization is predicted for a workload to be executed within the distributed computing environment based on respective power neural networks associated with the one or more computing devices. Instructions to execute at least a portion of the workload based on the predicted power utilizations for the one or more computing devices are transmitted to the plurality of computing devices.

12 Claims, 6 Drawing Sheets

(51) Int. Cl.
*G06N 3/098* (2023.01)
*G06N 20/20* (2019.01)

(56) References Cited

OTHER PUBLICATIONS

Huang et al., "Real-time Neural Network Inference on Extremely Weak Devices: Agile Offloading with Explainable AI", Oct. 2022 , ASCM MobiCom '22, pp. 200-213. (Year: 2022).*
Sarmento et al., "Forecasting Energy Power Consumption using Federated Learning in Edge Computing Devices", May 26, 2023, Future Generation Computer Systems. (Year: 2023).*
Li et al., "Energy-Aware, Device-to-Device Assisted Federated Learning in Edge Computing", May 18, 2023, IEEE. (Year: 2023).*

* cited by examiner

POWER NEURAL NETWORK-BASED WORKLOAD DISTRIBUTION IN DISTRIBUTED COMPUTING SYSTEMS

INTRODUCTION

Aspects of the present disclosure relate to workload distribution in distributed computing systems.

Some workloads, such as virtual reality (VR) applications in which a user is immersed in a virtual environment or augmented reality (AR) applications in which virtual objects are laid over a real-world environment viewed through a device (collectively referred to as extended reality (XR) workloads), are compute-intensive applications that involve real-time, or near-real-time, performance targets and complex data concurrencies (e.g., among different objects within the virtual or real-world environment). While some devices may have sufficient computing capabilities and power capabilities for executing these workloads on a standalone basis, other devices, such as mobile devices, may not have such sufficient capabilities. For example, a wearable device, such as an XR headset, or another compute-capability-constrained device may have limited physical space for power sources and heat dissipation while targeting long battery life and sufficient computing capabilities for executing compute-intensive workloads. Because of the conflict between performance capabilities and target capabilities, it may not be currently possible to execute compute-intensive workloads on a standalone basis on wearable devices or other compute-capability-constrained devices.

To allow for compute-intensive workloads to be executed in compliance with performance and timing targets defined for these compute-intensive workloads, compute-intensive workloads may be partitioned into multiple components for execution by different computing devices within a distributed computing environment. These workloads may be partitioned to account for the different capabilities, such as processing capabilities, communications capabilities, battery life, and so on, of the computing devices within the distributed computing environment. However, it may be difficult to accurately predict power utilization for computing devices within a distributed computing environment and to account for changes in the states (e.g., availability of high-power, high-performance modes at a device, imposition of power and performance constraints at a device due to available power or thermal constraints, etc.) of different computing devices within the distributed computing system.

BRIEF SUMMARY

Certain aspects of the present disclosure provide a method for distributing a workload across computing devices within a distributed computing system. An example method generally includes receiving, from at least one respective computing device of a plurality of computing devices in a distributed computing environment, information defining a respective power neural network. The respective power neural network generally is trained to predict power utilization for the respective computing device for a task to be executed on the respective computing device. For one or more computing devices of the plurality of computing devices, power utilization is predicted for a workload to be executed within the distributed computing environment based on respective power neural networks associated with the one or more computing devices. Instructions to execute at least a portion of the workload based on the predicted power utilizations for the one or more computing devices are transmitted to the plurality of computing devices in the distributed computing environment.

Certain aspects of the present disclosure provide a method for training a power neural network to predict power utilization for a workload executed on a computing device in a distributed computing environment. An example method generally includes training a power neural network for the computing device to predict power utilization for the computing device. Information defining the power neural network is transmitted to a workload controller in a distributed computing environment. An indication of a portion of a workload to be executed on the computing device is received from the workload controller. The indication of the portion of the workload to be executed may be based on a plurality of power neural networks including the trained power neural network. The indicated portion of the workload is executed.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict only certain aspects of this disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
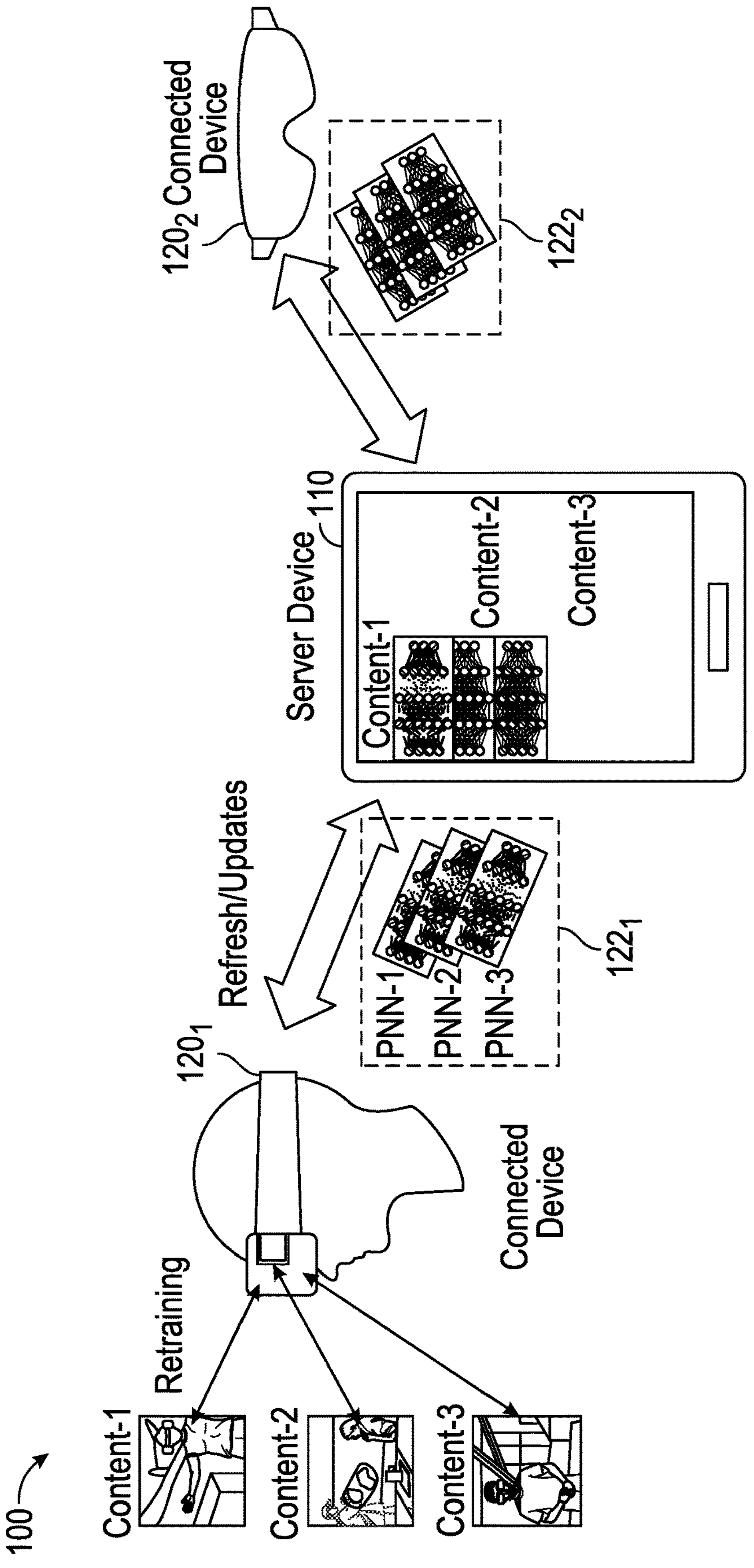
FIG. 1 illustrates an example environment in which a workload controller distributes a workload for execution on computing devices in a distributed computing environment based on power neural networks trained for the computing devices in the distributed computing environment, according to aspects of the present disclosure.

Aspects of the present disclosure provide apparatus, methods, processing systems, and computer-readable mediums for training and using neural networks in distributing workloads for execution in a distributed computing environment.

Distributed computing environments generally allow for many computing devices with varying capabilities to participate in processing a workload. Different portions of the workload may be distributed to different computing devices, taking into account various properties of the different computing devices within the distributed computing environment. Generally, computing devices with higher performance characteristics may be allocated larger portions of a workload or more complex portions of a workload for execution, while computing devices with lower performance characteristics may be allocated smaller portions of the workload or simpler portions of the workload for execution. For example, operations involving the use or training of machine learning models may be allocated to computing devices with higher performance characteristics, while operations that use inferences generated by these machine learning models may be allocated to computing devices with lower performance characteristics. In another example, operations involving the use of complex data types (e.g., large floating point numbers) may be allocated to computing devices with higher performance characteristics, while operations involving the use of simpler data types (e.g., fixed-point numbers, such as integers or long integers) may be allocated to computing devices with lower performance characteristics.

The performance capabilities of devices within a computing environment may change over time. For example, battery-powered devices, such as laptop computers, smartphones, tablets, XR headsets, or the like may have different power and performance modes that can be used as the available energy of a battery changes. These devices may allow for the use of higher performance modes (with correspondingly higher power usage properties) when there is a large amount of available energy to draw on and may restrict the use of these higher performance modes as the amount of available energy decreases. When a battery-powered device reaches a power threshold, in some cases, the device may switch to a low performance, low power usage mode to extend the amount of time the device can operate before the device is to be recharged (or otherwise connected to mains power).

Because computing devices in a distributed computing environment have different performance characteristics, and because these performance characteristics may vary due to various device-state-specific factors, it may be difficult for a workload coordinator (e.g., a server that distributes a workload to other devices in a distributed computing environment) to accurately distribute a workload for execution across different devices in the distributed computing environment. Further, because there are a large variety of devices that can operate in a distributed computing environment, the use of coarse classifications of devices (e.g., smartphones, wearable devices, etc.) by a workload coordinator may not allow for workloads to be accurately distributed to different devices.

Aspects of the present disclosure provide techniques for distributing workloads across computing devices in a distributed computing environment based on power neural networks trained for different computing devices in the distributed computing environment. By using power neural networks trained for different computing devices in order to predict power utilization for the different devices in the computing environment for a given workload, the workload can be distributed across different computing devices according to contextual information, such as specific performance characteristics of processors on the computing devices, availability of specific types of processors on the computing device, and the like, associated with these computing devices. Thus, a workload may be accurately partitioned to allow for the workload to be processed within the distributed computing environment so that the workload is completed according to timing constraints defined for the workload, thermal constraints for devices in the distributed computing environment, and the like.

Example Neural-Network-Based Workload Distribution in a Distributed Computing Environment FIG. 1 illustrates an example distributed computing environment 100 in which a workload controller distributes a workload for execution on computing devices in a distributed computing environment based on power neural networks trained for the computing devices in the distributed computing environment, according to aspects of the present disclosure. As illustrated, the distributed computing environment 100 includes a server device 110 and a plurality of connected devices 120.

To allow for workloads to be distributed across devices in distributed computing environment 100, each connected device 120 may train one or more respective power neural networks 122 to predict power utilization for the connected device for different workloads which may be executed within the environment 100. These trained power neural networks 122 may be provided to the server device 110 for use in predicting power utilization for connected devices 120 in the distributed computing environment 100 and in distributing portions of a workload to different connected devices 120 for execution. Generally, in providing the trained power neural networks 122 to the server device 110, each connected device 120 may provide information defining the respective power neural networks 122 to the server device 110 without providing specific details about the hardware available at each connected device 120 (e.g., processor cores, types of processors, battery capacity, thermal constraints, etc.).

Each connected device 120 may train one or more power neural networks 122 to predict power utilization for the connected device 120 for different workloads executed on the connected device 120. In some aspects, the one or more power neural networks 122 may include power neural networks for different types of processors or processing cores installed on the connected device 120. For example, different power neural networks 122 may be trained for low-power cores in a processor having a heterogeneous architecture (e.g., a big.LITTLE architecture used in ARM processors), high-power cores in a processor having a heterogeneous architecture, neural processing units (e.g., specialized processors that train and perform inference operations using machine learning models), graphics processing units, application-specific integrated circuits (ASICs), systems-on-chip (SoCs), and the like.

Generally, a power neural network 122 may be trained based on training data sets of various properties of a processor mapped to measured power utilization for a given workload. These various properties may include, for example, information about power events, architectural information about the processor, timing and/or frequency information about the processor, process-related information about the processor, and the like. In some aspects, the process-related information may include process, voltage, and/or temperature-related information for the processor (e.g., information about a specific process-voltage-temperature (PVT) corner defining the fabrication and operation characteristics of the processor). In some aspects, the inputs may include other information which can be used to predict power utilization for the processor, such as a battery state, traffic or loading information, information about the workload itself, and the like.

In some aspects, the power neural networks 122 may be trained and pre-loaded on the processors at the connected device 120. When a connected device 120 joins a distributed computing environment 100, the connected device 120 can share the pre-loaded power neural networks 122 to the server device 110 for use in predicting power utilization for the connected device 120 and distributing portions of a workload to the connected device 120.

In some aspects, the power neural networks 122 may be trained to predict power utilization for different workloads which can be executed on the connected device 120. As new workloads arise within the distributed computing environment 100, information about the new workload can be provided to the connected devices 120 for use in retraining the power neural networks 122. The information about the new workload may include, for example, information about the amount of data involved in the new workload, types of data involved in the new workload, an output to be generated when executing the new workload, processors to use or prioritize in executing the new workload, and the like. The new workload may be executed by the connected device 120 one or more times to determine the power utilization for the computing device under varying circumstances, and the information about the new workload and determined power utilization can be used to retrain the power neural networks 122.

In some aspects, the power neural networks 122 may be trained to predict power utilization for the computing device based on information defining power events within a connected device 120 for which the power neural networks 122 are trained. These power events may include, for example, transitions from a charging state to a non-charging state, transitions from a non-charging state to a charging state, transitions between these states at defined remaining energy capacity levels for the connected device 120, transitions between different remaining energy capacity levels for the connected device 120, and the like.

Server device 110 uses aggregates of the power neural networks 122 received from the connected devices 120 in the distributed computing environment 100 to predict power utilization for different portions of a workload and distribute the workload for execution within the distributed computing environment 100. Server device 110 may, in some aspects, divide the workload into a plurality of partitions for distribution to the connected devices 120 in the distributed computing environment 100 and predict power utilization for the connected devices 120 for each partition into which the workload is divided. The partitions into which a workload is partitioned may be, for example, defined as a task or set of tasks which may not be amenable to further partitioning for processing on different connected devices 120 in the distributed computing environment. In some aspects, the partitioning of a workload in a distributed computing environment may be defined a priori for different workloads or may be defined based on telemetry gathered during test execution of these workloads in a test or production environment.

In distributing portions of the workload for execution on different connected devices 120 in the distributed computing environment 100, server device 110 can cause these portions of the workload to be executed in parallel or substantially in parallel within the distributed computing environment. By executing a workload substantially in parallel, the workload can be completed in a shorter amount of time than would be the case if the workload was executed sequentially by a single device in the distributed computing environment. Thus, aspects of the present disclosure may allow for workloads to be executed with reduced latency, which may allow for actions to be more rapidly performed within the distributed computing environment 100.

Generally, server device 110 selects a set of connected devices 120 in the distributed computing environment 100 to use in executing the workload based on the predicted power utilization for the connected devices 120. The devices in the set of connected devices 120 may be selected based, for example, on a resource minimization strategy that matches different portions of a workload to different devices based on minimizing differences between defined maximum power utilization metrics for these devices and the predicted power utilization for these devices. In another example, the devices in the set of connected devices 120 selected by server device 110 may be selected based on a minimization strategy that attempts to minimize the number of devices that are used to process the workload. In still another example, the devices in the set of connected devices 120 may be selected based on predicted power utilization and other metrics, such as network latency, radio access technologies (RATs) and frequency bands on which these connected devices 120 communicate (e.g., whether a connected device 120 is communicating with other devices in the distributed computing environment 100 using near-millimeter-wave or millimeter wave communications (e.g., communications using frequencies in the FR2 bands between 24.25 GHZ and 52.6 GHZ)), a type of device (e.g., whether a device is a Machine Type Communications (MTC) or Massive MTC (MMTC) device), available battery power (e.g., if such information is reported to server device 110), or other metrics that may influence the availability or unavailability of a connected device 120 within the distributed computing environment 100.

In some aspects, the workload distributed for execution within the distributed computing environment 100 may be a graphics rendering workload. The graphics rendering workload may be, for example, a workload in a gaming application, an image processing application, a video processing application, a streaming application, or the like. In some aspects, the graphics rendering workload may be executed within an XR environment, and at least one of the connected devices 120 in the set of devices selected by the server device 110 to execute the workload may be, include, or otherwise be connected with a display on which the XR environment is displayed.

In some aspects, as operating properties of a connected device 120 in the distributed computing environment 100 change, information may be provided to server device 110 to identify these changes. For example, information about the power state of a connected device 120 may be provided periodically to the server device 110 so that the server device 110 can use the appropriate power information to predict power utilization for a workload and determine whether the connected device can participate in processing the workload or a portion thereof. In some aspects, the information provided by a connected device 120 may indicate that the connected device is no longer a candidate device for processing workloads in the distributed computing environment 100. In such a case, the server device 110 can discontinue use of the power neural networks associated with the connected device 120 in predicting power utilization for executing a workflow within the distributed computing environment 100 until the connected device 120 indicates that the connected device 120 is again a candidate device for processing workloads in the distributed computing environment. A connected device 120 may not be a candidate device for processing workloads in the distributed computing environment 100, for example, when the connected device 120 has less than a threshold amount of energy remaining in a power source, and the connected device 120 may become a candidate device when the connected device 120 is connected to mains power and the amount of energy remaining in the power source exceeds a threshold level.

While FIG. 1 illustrates the distribution of a workload by a server device within the distributed computing environment 100, it should be recognized by one of skill in the art that a workload may be managed by a variety of devices in the distributed computing environment. For example, a workload may be managed by a connected device 120 serving as a relay between the server device 110 and other connected devices in the distributed computing environment 100, a connected device 120 designated by the server device 110 or within an application as a workload controller, or the like.

Figure 2:
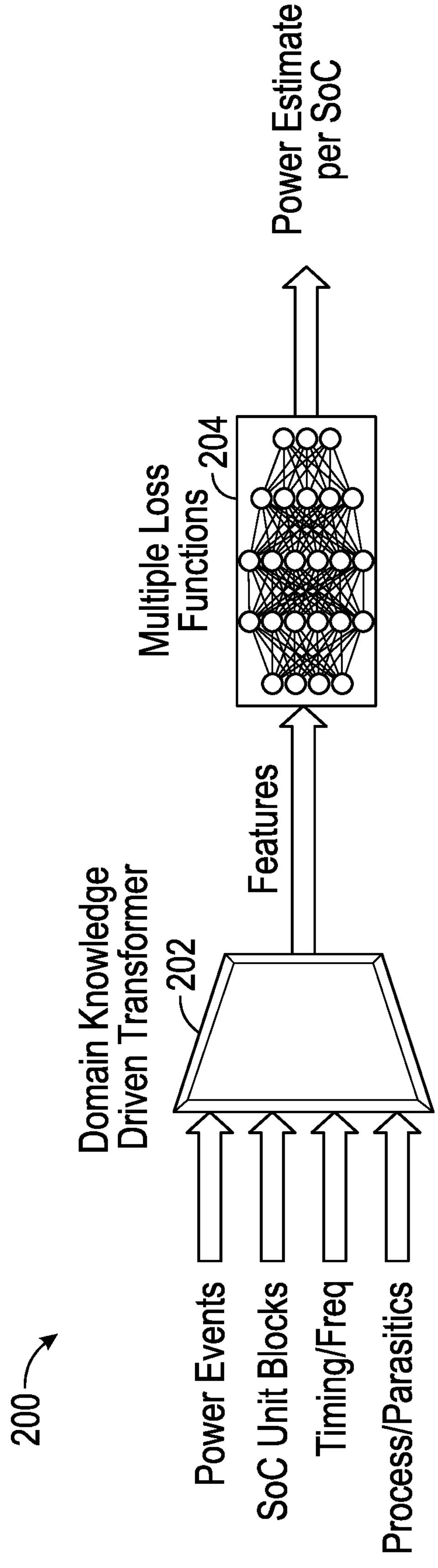
FIG. 2 illustrates an example neural network that predicts power utilization of a computing device for executing a workload, according to aspects of the present disclosure.

FIG. 2 illustrates an example neural network 200 that predicts power utilization of a computing device for executing a workload, according to aspects of the present disclosure. Generally neural network 200 may correspond to the power neural networks 122 illustrated in FIG. 1.

As illustrated, neural network 200 includes a feature generation block 202 and one or more layers 204 which generate an estimated power utilization for a given set of processors and a given workload deployed on a computing device in a distributed computing environment. Feature generation block 202 generally transforms input data, such as power events, architectural information for one or more processors of the respective computing device, frequency information for the one or more processors of the respective computing device, and/or process-related information for the one or more processors of the respective computing device, into numerical features which the neural network layers 204 can use to learn correlations between the input data and power utilization for a workflow executed on a computing device. Generally, power event data may include information identifying transitions between different power states for a computing device, such as transitions from various low-power modes to high-power modes defined for the computing device. In some aspects, a power event may include a transition between different clock frequency-voltage value pairs, representing the frequency of a processor and a maximum amount of power the processor can draw from a power source while operating using a specific clock frequency-voltage value pair. Frequency information may include information such as a maximum clock frequency at which the processor operates, an average clock frequency over time during execution of a workload while a processor is set to a specific power state, or the like. In some aspects, the feature generation block 202 may extract additional features from other input data points to use as an input into the neural network layers 204. For example, the feature generation block can extract features from information such as current processor load, battery capacity sensors, network traffic being processed by a computing device, and the like as additional inputs that can be used to predict power utilization for a device when executing a workload or a portion thereof.

In some aspects, the feature generation block 202 may be a transformer neural network or other type of neural network that can extract features (e.g., numerical values in one or more dimensions) that can be used to train neural network 200 to predict power utilization for the computing device during execution of a given workload or portion thereof.

The features generated by feature generation block 202, as discussed, may be input into neural network layers 204 for further processing. Generally, the neural network layers 204 may implement or otherwise be trained based on minimization, or optimization, of one or more defined loss functions. Ultimately, the output of neural network layers 204 may be a predicted power utilization for executing a given workload or portion thereof on a computing device. In some aspects, neural network 200 may be a single model accounting for power utilization across different processors and types of processors on a computing device. In some aspects, neural network 200 may be trained for each processor or type of processor, and the appropriate neural network may be used at inference time based on the type of processor on which a workload or portion thereof is executed.

Figure 3:
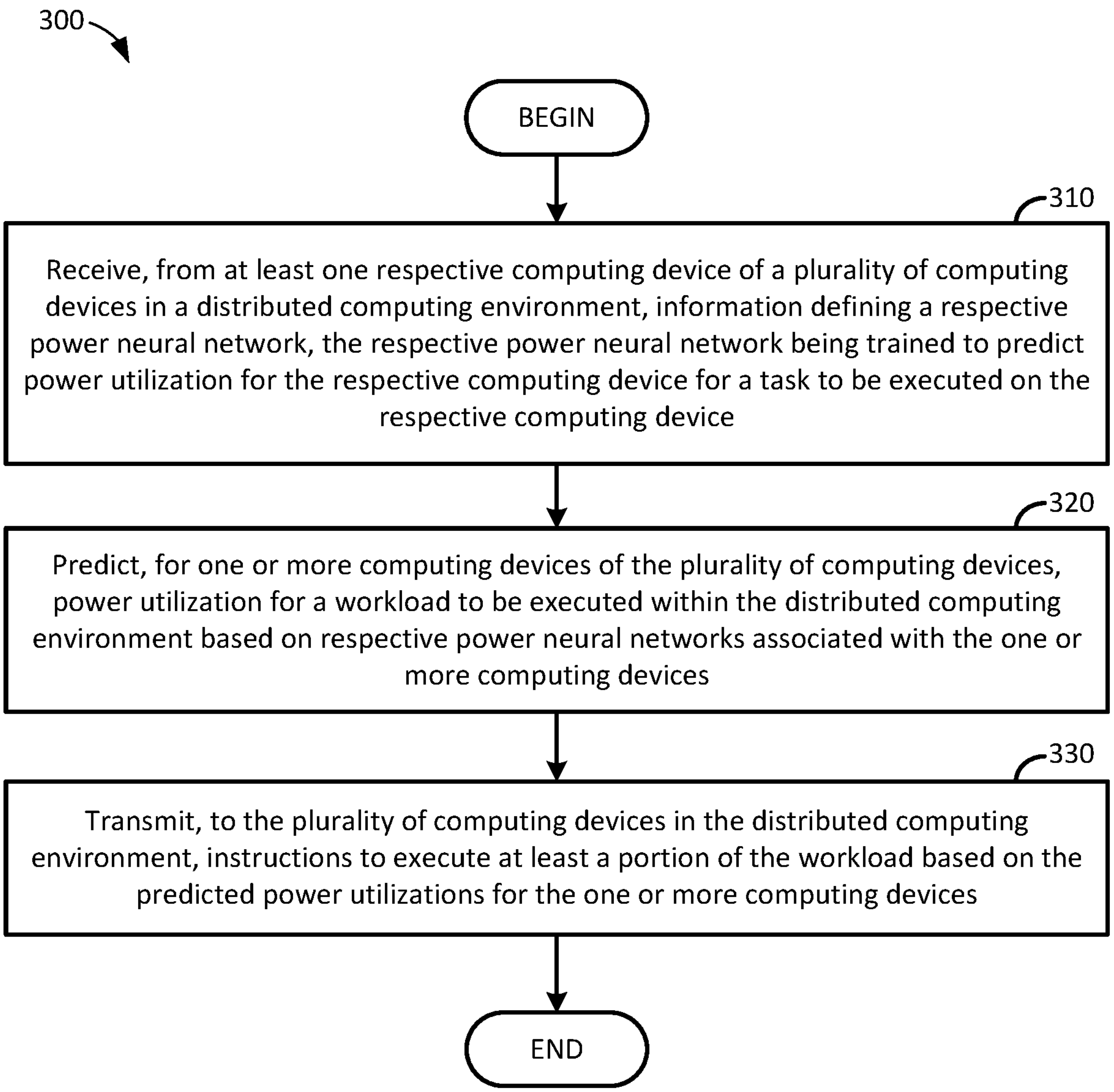
FIG. 3 illustrates example operations for distributing a workload for execution on different computing devices in a distributed computing environment based on power neural networks trained for the devices in the distributed computing environment, according to aspects of the present disclosure.

FIG. 3 illustrates example operations 300 for distributing a workload for execution on different computing devices in a distributed computing environment based on power neural networks trained for the devices in the distributed computing environment, according to aspects of the present disclosure. Operations 300 may be performed by a workload coordinator executing on a server device in a distributed computing environment or on an edge device in the distributed computing environment.

As illustrated, operations 300 begin at block 310, with receiving, from at least one respective computing device of a plurality of computing devices in a distributed computing environment, information defining a respective power neural network. Generally, the respective power neural network is trained to predict power utilization for the respective computing device for a task to be executed on the respective computing device.

In some aspects, the respective power neural network comprises a neural network includes at least weights, biases, and neural network structure information that allow for the power utilization to be predicted for the respective computing device. In some aspects, the respective neural network avoids exposing architectural information about one or more processors on the respective computing device.

In some aspects, the respective power neural network for the respective computing device comprises a neural network that predicts the power utilization for the respective computing device based on at least one of features derived from power events, architectural information for one or more processors of the respective computing device, frequency information for the one or more processors of the respective computing device, or process-voltage-temperature (PVT)-related information for the one or more processors of the respective computing device. In some aspects, operations 300 may further include transmitting, to the at least one respective computing device in the distributed computing environment, information defining one or more power events based on which each respective power neural network is to be trained.

At block 320, operations 300 proceed with predicting, for one or more computing devices of the plurality of computing devices, power utilization for a workload to be executed within the distributed computing environment based on respective power neural networks associated with the one or more computing devices.

At block 330, operations 300 proceed with transmitting, to the plurality of computing devices in the distributed computing environment, instructions to execute at least a portion of the workload based on the predicted power utilizations for the one or more computing devices.

In some aspects, the workload may include a graphics rendering operation (e.g., in a gaming application, an image processing application, a video processing application, a video streaming application, etc.) executed by the plurality of computing devices in the distributed computing environment. The graphics rendering operation may be, for example, a rendering operation in an extended reality (XR) environment, where at least one computing device of the plurality of computing devices includes a display on which the XR environment is displayed.

In some aspects, operations 300 further include transmitting, to the respective computing device, one or more benchmark scenarios for training the respective power neural network. Generally, receiving the respective power neural network includes receiving the respective power neural network in response to transmitting the one or more benchmark scenarios to the respective computing device.

In some aspects, operations 300 further include transmitting, to the at least one respective computing device, information defining a new workload to be executed within the distributed computing environment. A respective updated power neural network is received from the respective computing device based on the information defining the new workload. Power utilization for the new workload executed within the distributed computing environment is predicted for the one or more computing devices of the plurality of computing devices based on updated power neural networks associated with the one or more computing devices. Additional instructions to execute at least a portion of the new workload are transmitted to the plurality of computing devices in the distributed computing environment based on the predicted power utilization for the plurality of computing devices In some aspects, the computing devices in the distributed computing environment may include enhanced Mobile Broad Band (eMMB) devices and/or Ultra Reliable Low Latency Communication (URLLC) devices in a wireless communications network. Generally, eMMB and URLLC devices may include devices that are able to communicate within the wireless communications network using higher bit rates and lower latency than other devices within the wireless communications network (e.g., communicate using millimeter wave or near-millimeter-wave frequencies in a 5G wireless communications network). In some aspects, the computing devices in the distributed computing environment may also or alternatively include various low-power devices, such as Machine Type Communication (MTC) or Massive MTC (MMTC) devices which have limited processing capabilities and operate using limited amounts of power.

In some aspects, operations 300 further include providing, to at least one of the plurality of computing devices in the distributed computing environment, feedback related to the workload for use in retraining the power neural networks associated with the at least one of the plurality of computing devices. The feedback may include, for example, device state or performance information for a computing device (e.g., battery level, latency measurements, throughput, thermal status, etc.) for a workload executed on the computing device, information identifying whether the device is currently being used to execute some other task or if the execution of other workloads are being prioritized on the device, an indication of other workloads executing on the device, information about other resources that are available for use on the device, workload status information, performance-power information (e.g., total operations per watt consumed), or the like.

In some aspects, a server (e.g., server device 110 illustrated in FIG. 1) may manage distribution of the workload across the plurality of computing devices. Predicting the power utilization for the workload may be performed by the server.

Figure 4:
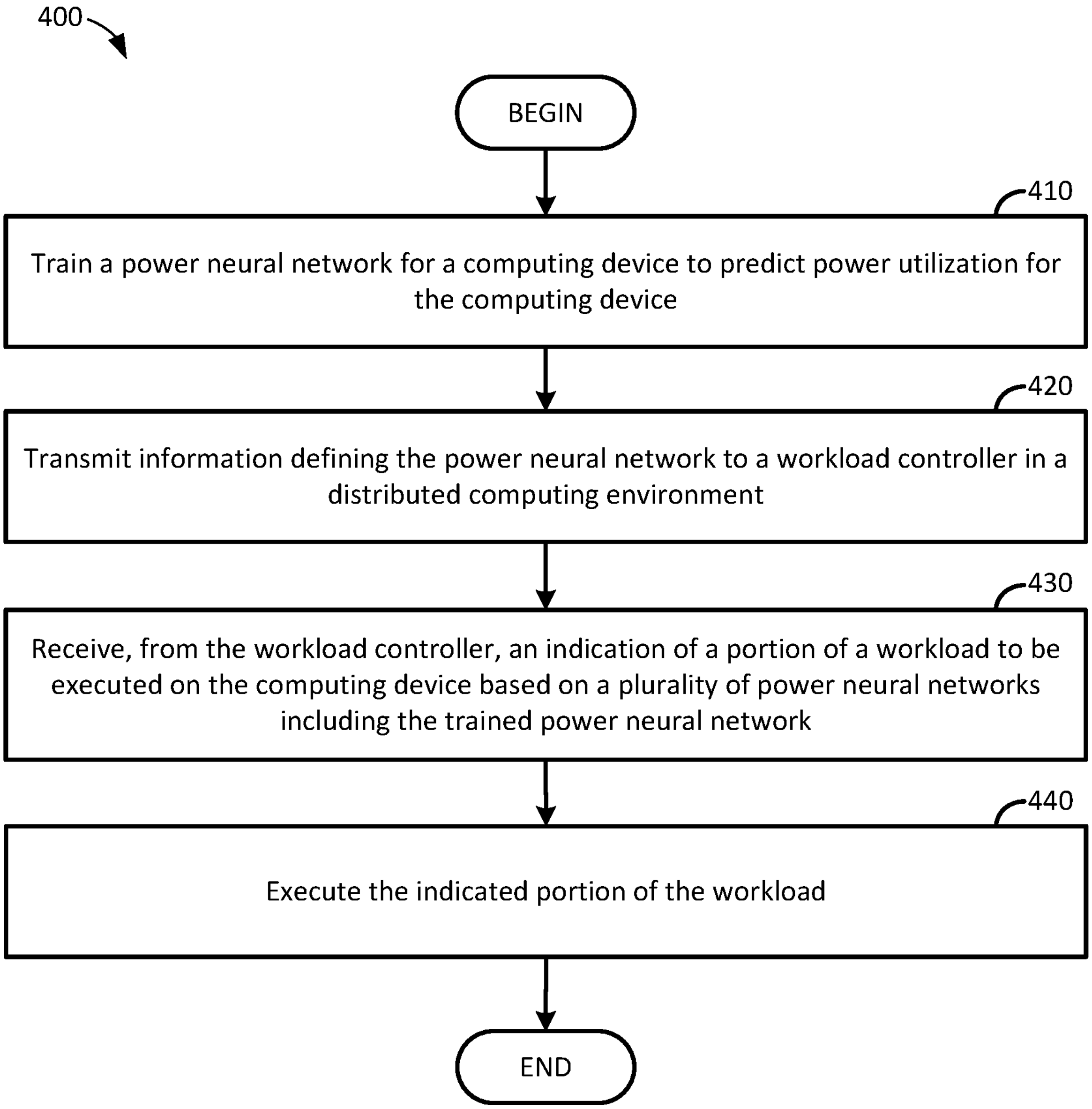
FIG. 4 illustrates example operations for training a power neural network for predicting power utilization for a computing device, according to aspects of the present disclosure.

FIG. 4 illustrates example operations 400 for training a power neural network for predicting power utilization for a computing device, according to aspects of the present disclosure. Operations 400 may be performed by a computing device in a distributed computing system (e.g., connected device 120 illustrated in FIG. 1) that can participate in processing a workload in the distributed computing system.

As illustrated, operations 400 begin at block 410, with training a power neural network for the computing device to predict power utilization for the computing device.

In some aspects, training the power neural network includes training a transformer neural network to extract at least one of features from power events, architectural information for one or more processors on a computing device, frequency information for the one or more processors on the computing device, or process-voltage-temperature (PVT)-related information for the one or more processors on the computing device and training the power neural network to predict the power utilization for the computing device based on the extracted features.

At block 420, operations 400 proceed with transmitting information defining the power neural network to a workload controller in the distributed computing environment.

At block 430, operations 400 proceed with receiving, from the workload controller, an indication of a portion of a workload to be executed on the computing device based on a plurality of power neural networks including the trained power neural network.

At block 440, operations 400 proceed with executing the indicated portion of the workload.

In some aspects, operations 400 further include receiving, from the workload controller, information defining a new workload to be executed within the distributed computing environment. The power neural network is retrained to predict power utilization for workloads including the new workload. Information defining the retrained power neural network is transmitted to the workload controller in the distributed computing environment for use in distributing execution of the new workload across computing devices in the distributed computing environment. In some aspects, operations 400 further include receiving, from the workload controller, an indication of a portion of the new workload to be executed on the computing device based on the plurality of power neural networks including the retrained power neural network and executing the indicated portion of the new workload.

In some aspects, operations 400 include receiving, from the workload controller, one or more benchmark scenarios for training the power neural network. Training the power neural network generally includes training the power neural network in response to receiving the one or more benchmark scenarios from the workload controller.

In some aspects, wherein the power neural network comprises a neural network including weights, biases, and neural network structure information that allow for power utilization to be predicted for a computing device. The power neural network may avoid exposing architectural information about one or more processors on the computing device.

In some aspects, operations 400 further include receiving, from the workload controller, feedback related to the workload, and retraining the power neural network based on the received feedback.

In some aspects, the workload may include a graphics rendering operation (e.g., in a gaming application, an image processing application, a video processing application, a video streaming application, etc.) executed by the plurality of computing devices in the distributed computing environment. The graphics rendering operation may be, for example, a rendering operation in an extended reality (XR) environment, where at least one computing device of the plurality of computing devices includes a display on which the XR environment is displayed.

Figure 5:
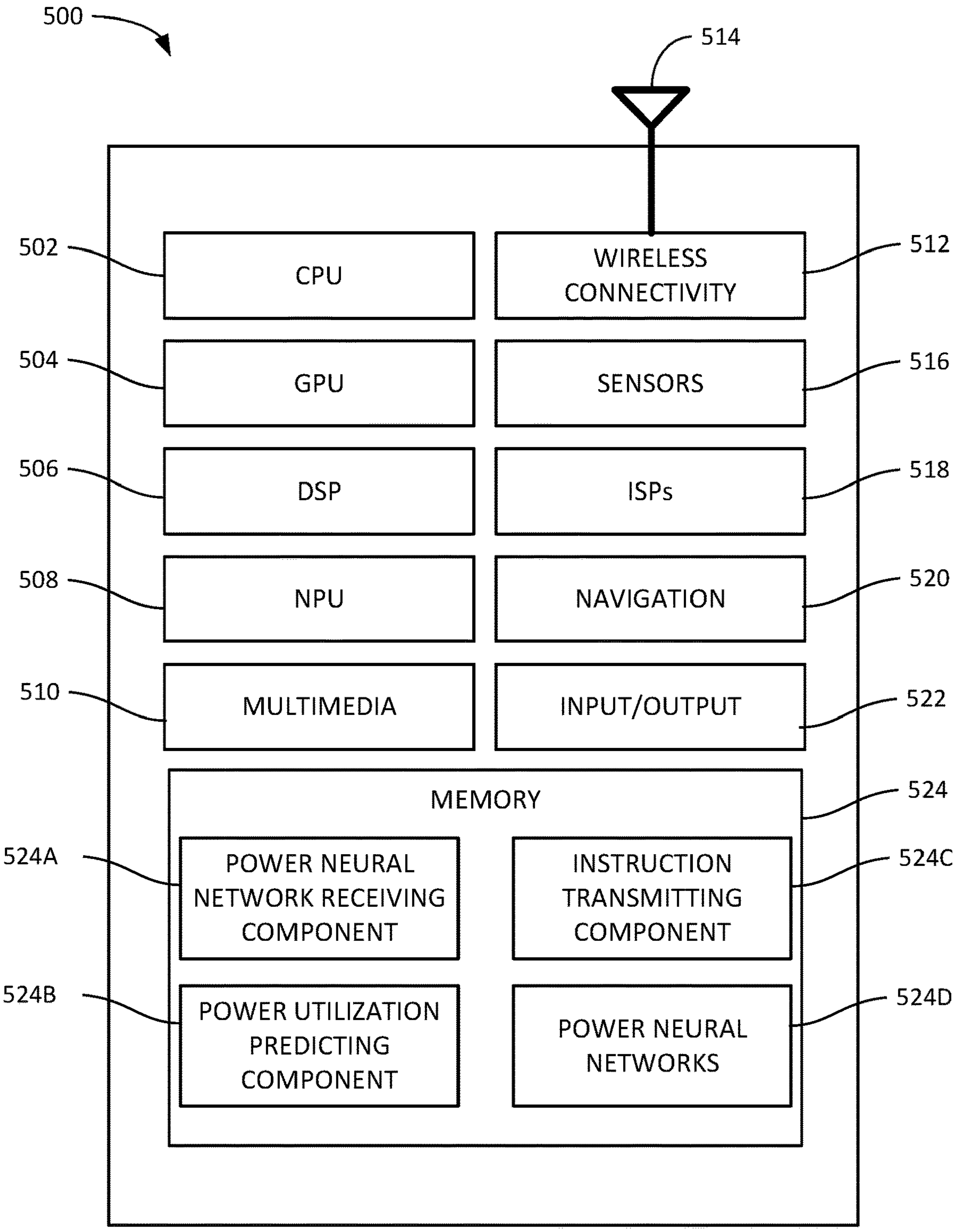
FIG. 5 depicts an example processing system configured to perform various aspects of the present disclosure.

Example Processing Systems for Neural-Network-Based Workload Distribution in a Distributed Computing Environment FIG. 5 depicts an example processing system 500 for distributing execution of a workload in a distributed computing environment based on power neural networks trained for computing devices in the distributed computing environment, such as described herein for example with respect to FIG. 3.

Processing system 500 includes a central processing unit (CPU) 502, which in some examples may be a multi-core CPU. Instructions executed at the CPU 502 may be loaded, for example, from a program memory associated with the CPU 502 or may be loaded from a memory partition (e.g., of memory 524).

Processing system 500 also includes additional processing components tailored to specific functions, such as a graphics processing unit (GPU) 504, a digital signal processor (DSP) 506, a neural processing unit (NPU) 508, and a connectivity component 512.

An NPU, such as NPU 508, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In one implementation, NPU 508 is a part of one or more of CPU 502, GPU 504, and/or DSP 506. These may be located on a UE or another computing device.

In some examples, connectivity component 512 may include subcomponents, for example, for third generation (3G) connectivity, fourth generation (4G) connectivity (e.g., LTE), fifth generation (5G) connectivity (e.g., NR), Wi-Fi connectivity, Bluetooth connectivity, and other wireless data transmission standards. Connectivity component 512 may be further coupled to one or more antennas (not shown).

In some examples, one or more of the processors of processing system 500 may be based on an ARM or RISC-V instruction set.

Processing system 500 also includes memory 524, which is representative of one or more static and/or dynamic memories, such as a dynamic random access memory, a flash-based static memory, and the like. In this example, memory 524 includes computer-executable components, which may be executed by one or more of the aforementioned processors of processing system 500.

In particular, in this example, memory 524 includes power neural network receiving component 524A, power utilization predicting component 524B, instruction transmitting component 524C, and power neural networks 524D. The depicted components, and others not depicted, may be configured to perform various aspects of the methods described herein.

Generally, processing system 500 and/or components thereof may be configured to perform the methods described herein.

Figure 6:
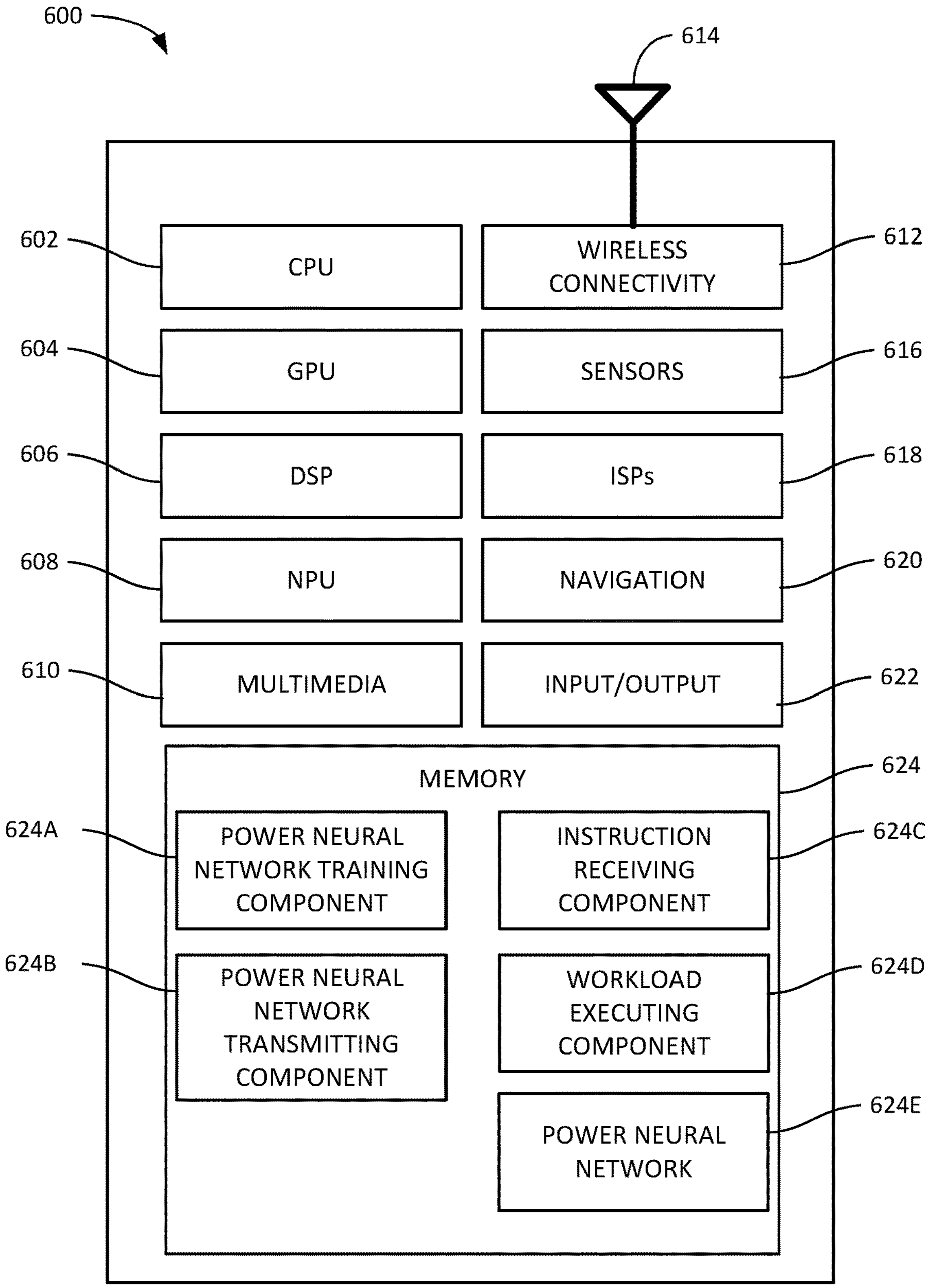
FIG. 6 depicts an example processing system configured to perform various aspects of the present disclosure.

FIG. 6 depicts an example processing system 600 for training power neural networks for use in distributing a workload across computing devices in a distributed computing environment, such as described herein for example with respect to FIG. 4.

Processing system 600 includes a central processing unit (CPU) 602 and may include additional processing components tailored to specific functions, such as a graphics processing unit (GPU) 604, a digital signal processor (DSP) 606, a neural processing unit (NPU) 608, a multimedia processing unit 610, and a wireless connectivity component 612. CPU 602, GPU 604, DSP 606, and NPU 608 may be similar to CPU 702. GPU 704, DSP 706, and NPU 708 discussed above with respect to FIG. 7.

In some examples, wireless connectivity component 612 may include subcomponents, for example, for third generation (3G) connectivity, fourth generation (4G) connectivity (e.g., LTE), fifth generation (5G) connectivity (e.g., NR), Wi-Fi connectivity, Bluetooth connectivity, and other wireless data transmission standards. Wireless connectivity component 612 is further coupled to one or more antennas 614.

Processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes power neural network training component 624A, power neural network transmitting component 624B, instruction receiving component 624C, workload executing component 624D, and power neural network 624E. The depicted components, and others not depicted, may be configured to perform various aspects of the methods described herein.

Generally, processing system 600 and/or components thereof may be configured to perform the methods described herein.

Notably, in other aspects, features of processing system 600 may be omitted, such as where processing system 600 is a server computer or the like. For example, multimedia processing unit 610, wireless connectivity component 612, sensor processing units 616, ISPs 618, and/or navigation processor 620 may be omitted in other aspects. Further, aspects of processing system 600 may be distributed, such as training a model and using the model to generate inferences, such as user verification predictions.

Example Clauses

Implementation examples are described in the following numbered clauses:

Clause 1: A processor-implemented method, comprising: receiving, from at least one respective computing device of a plurality of computing devices in a distributed computing environment, information defining a respective power neural network that predicts power utilization for the respective computing device for a task to be executed on the respective computing device; predicting, for one or more computing devices of the plurality of computing devices, power utilization for a workload to be executed within the distributed computing environment based on respective power neural networks associated with the one or more computing devices; and transmitting, to the plurality of computing devices in the distributed computing environment, instructions to execute at least a portion of the workload based on the predicted power utilizations for the one or more computing devices.

Clause 2: The method of Clause 1, further comprising transmitting, to the respective computing device, one or more benchmark scenarios for training the respective power neural network, wherein receiving the respective power neural network comprises receiving the respective power neural network in response to transmitting the one or more benchmark scenarios to the respective computing device.

Clause 3: The method of Clause 1 or 2, wherein the respective power neural network comprises a neural network including weights, biases, and neural network structure information that allow for the power utilization to be predicted for the respective computing device.

Clause 4: The method of Clause 3, wherein the respective neural network avoids exposing architectural information about one or more processors on the respective computing device.

Clause 5: The method of any of Clauses 1 through 4, further comprising: transmitting, to the at least one respective computing device, information defining a new workload to be executed within the distributed computing environment; receiving, from the respective computing device, a respective updated power neural network based on the information defining the new workload; predicting, for the one or more computing devices of the plurality of computing devices, power utilization for the new workload executed within the distributed computing environment based on updated power neural networks associated with the one or more computing devices; and transmitting, to the plurality of computing devices in the distributed computing environment, additional instructions to execute at least a portion of the new workload based on the predicted power utilization for the plurality of computing devices.

Clause 6: The method of any of Clauses 1 through 5, wherein the respective power neural network for the respective computing device comprises a neural network that predicts the power utilization for the respective computing device based on at least one of features derived from power events, architectural information for one or more processors of the respective computing device, frequency information for the one or more processors of the respective computing device, or process-voltage-temperature (PVT)-related information for the one or more processors of the respective computing device.

Clause 7: The method of Clause 6, further comprising transmitting, to the at least one respective computing device in the distributed computing environment, information defining one or more power events based on which each respective power neural network is to be trained.

Clause 8: The method of any of Clauses 1 through 7, wherein the workload comprises a graphics rendering operation executed by the plurality of computing devices in the distributed computing environment.

Clause 9: The method of Clause 8, wherein the graphics rendering operation comprises a rendering operation in an extended reality (XR) environment, and wherein at least one computing device of the plurality of computing devices includes a display on which the XR environment is displayed.

Clause 10: The method of Clauses 8 or 9, wherein the graphics rendering operation comprises a rendering operation in one of a gaming application, an image rendering application, or a video processing operation.

Clause 11: The method of any of Clauses 1 through 10, wherein a server manages distribution of the workload across the plurality of computing devices, and wherein predicting the power utilization for the workload executed within the distributed computing environment is performed by the server.

Clause 12: The method of any of Clauses 1 through 11, further comprising providing, to at least one of the plurality of computing devices in the distributed computing environment, feedback related to the workload for use in retraining the power neural networks associated with the at least one of the plurality of computing devices.

Clause 13: A method implemented by a computing device, comprising: training a power neural network for the computing device to predict power utilization for the computing device; transmitting information defining the power neural network to a workload controller in the distributed computing environment; receiving, from the workload controller, an indication of a portion of a workload to be executed on the computing device based on a plurality of power neural networks including the trained power neural network; and executing the indicated portion of the workload.

Clause 14: The method of Clause 13, wherein training the power neural network comprises: training a transformer neural network to extract at least one of features from power events, architectural information for one or more processors on a computing device, frequency information for the one or more processors on the computing device, or process-voltage-temperature (PVT)-related information for the one or more processors on the computing device; and training the power neural network to predict the power utilization for the computing device based on the extracted features.

Clause 15: The method of Clauses 13 or 14, further comprising: receiving, from the workload controller, information defining a new workload to be executed within the distributed computing environment; retraining the power neural network to predict power utilization for workloads including the new workload; and transmitting information defining the retrained power neural network to the workload controller in the distributed computing environment for use in distributing execution of the new workload across computing devices in the distributed computing environment.

Clause 16: The method of Clause 15, further comprising: receiving, from the workload controller, an indication of a portion of the new workload to be executed on the computing device based on the plurality of power neural networks including the retrained power neural network; and executing the indicated portion of the new workload.

Clause 17: The method of any of Clauses 13 through 16, further comprising receiving, from the workload controller, one or more benchmark scenarios for training the power neural network, wherein training the power neural network comprises training the power neural network in response to receiving the one or more benchmark scenarios from the workload controller.

Clause 18: The method of any of Clauses 13 through 17, wherein the power neural network comprises a neural network including weights, biases, and neural network structure information that allow for power utilization to be predicted for a computing device.

Clause 19: The method of Clause 18, wherein the power neural network avoids exposing architectural information about one or more processors on the computing device.

Clause 20: The method of any of Clauses 13 through 19, further comprising: receiving, from the workload controller, feedback related to the workload; and retraining the power neural network based on the received feedback.

Clause 21: The method of any of Clauses 13 through 20, wherein the workload comprises a graphics rendering operation executed by one or more computing devices within the distributed computing environment.

Clause 22: The method of Clause 21, wherein the graphics rendering operation comprises a rendering operation in an extended reality (XR) environment, and wherein the computing device includes a display on which the XR environment is displayed.

Clause 23: The method of Clauses 21 or 22, wherein the graphics rendering operation comprises a rendering operation in one of a gaming application, an image rendering application, or a video processing operation.

Clause 24: A system, comprising: a memory having executable instructions stored thereon; and a processor configured to execute the executable instructions in order to cause the system to perform the operations of any of Clauses 1 through 23.

Clause 25: A system, comprising means for performing the operations of any of Clauses 1 through 23.

Clause 26: A computer-readable medium having instructions stored thereon which, when executed by a processor, perform the operations of any of Clauses 1 through 23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of workload distribution implemented by a computing device, comprising:

training a power neural network for the computing device to predict power utilization for the computing device;

transmitting information defining the power neural network to a workload controller in a distributed computing environment;

receiving, from the workload controller, an indication of a portion of a workload to be executed on the computing device based on a plurality of power neural networks including the trained power neural network; and executing the indicated portion of the workload.

2. The method of claim 1, wherein training the power neural network comprises:

training a transformer neural network to extract at least one of features from power events, architectural information for one or more processors on the computing device, frequency information for the one or more processors on the computing device, or process-voltage-temperature (PVT)-related information for the one or more processors on the computing device; and training the power neural network to predict the power utilization for the computing device based on the extracted features.

3. The method of claim 1, further comprising:

receiving, from the workload controller, information defining a new workload to be executed within the distributed computing environment;

retraining the power neural network to predict power utilization for workloads including the new workload; and transmitting information defining the retrained power neural network to the workload controller in the distributed computing environment for use in distributing execution of the new workload across computing devices in the distributed computing environment.

4. The method of claim 3, further comprising:

receiving, from the workload controller, an indication of a portion of the new workload to be executed on the computing device based on the plurality of power neural networks including the retrained power neural network; and executing the indicated portion of the new workload.

5. The method of claim 1, further comprising receiving, from the workload controller, one or more benchmark scenarios for training the power neural network, wherein training the power neural network comprises training the power neural network in response to receiving the one or more benchmark scenarios from the workload controller.

6. The method of claim 1, wherein the power neural network comprises a neural network including weights, biases, and neural network structure information that allow for power utilization to be predicted for the computing device.

7. The method of claim 6, wherein the power neural network avoids exposing architectural information about one or more processors on the computing device.

8. The method of claim 1, further comprising:

receiving, from the workload controller, feedback related to the workload; and retraining the power neural network based on the received feedback.

9. The method of claim 1, wherein the workload comprises a graphics rendering operation executed by one or more computing devices within the distributed computing environment.

10. The method of claim 9, wherein the graphics rendering operation comprises a rendering operation in an extended reality (XR) environment, and wherein the computing device includes a display on which the XR environment is displayed.

11. The method of claim 9, wherein the graphics rendering operation comprises a rendering operation in one of a gaming application, an image rendering application, or a video processing operation.

12. A system comprising:

memory having executable instructions stored thereon; and at least one processor configured to execute the executable instructions in order to cause the system to:

train a power neural network for a computing device to predict power utilization for the computing device;

transmit information defining the power neural network to a workload controller in a distributed computing environment;

receive, from the workload controller, an indication of a portion of a workload to be executed on the computing device based on a plurality of power neural networks including the trained power neural network; and execute the indicated portion of the workload.

* * * * *